United States Patent [19]
Pike

[11] 3,751,976
[45] Aug. 14, 1973

[54] ULTRASONIC INSPECTION SYSTEM WITH PSEUDO-ISOMETRIC DISPLAY

[75] Inventor: Victor Eugene Pike, Cincinnati, Ohio

[73] Assignee: General Electric Company, Lynn, Mass.

[22] Filed: July 24, 1972

[21] Appl. No.: 274,174

[52] U.S. Cl. ............................................. 73/67.9
[51] Int. Cl. ......................................... G01n 29/04
[58] Field of Search ............... 73/67.8 R, 67.8 S, 73/67.9

[56] References Cited
UNITED STATES PATENTS

| | | | |
|---|---|---|---|
| 3,023,611 | 3/1962 | Howry | 73/67.8 S |
| 3,063,290 | 11/1962 | Kaserman et al. | 73/67.8 S |
| 3,369,626 | 2/1968 | Zemanek et al. | 73/67.7 X |

FOREIGN PATENTS OR APPLICATIONS

| | | | |
|---|---|---|---|
| 858,285 | 1/1961 | Great Britain | 73/67.8 S |

Primary Examiner—Richard C. Queisser
Assistant Examiner—John P. Beauchamp
Attorney—Edward S. Roman et al.

[57] ABSTRACT

In an ultrasonic inspection system for bodies of circular cross-section, an ultrasonic beam makes a plurality of circumferential scans around the body at spaced apart locations along the length thereof, such that each consecutive circumferential scan is individually displayed as a Lissajous figure offset from a Lissajous figure of a preceding scan. The overall display effect is therefore pseudo-isometric, and defects within the body are displayed as local pulse distortions along the Lissajous figures.

The invention herein described was made in the course of or under a contract or subcontract thereunder (or grant) with the Department of the Air Force.

6 Claims, 1 Drawing Figure

PATENTED AUG 14 1973                3,751,976
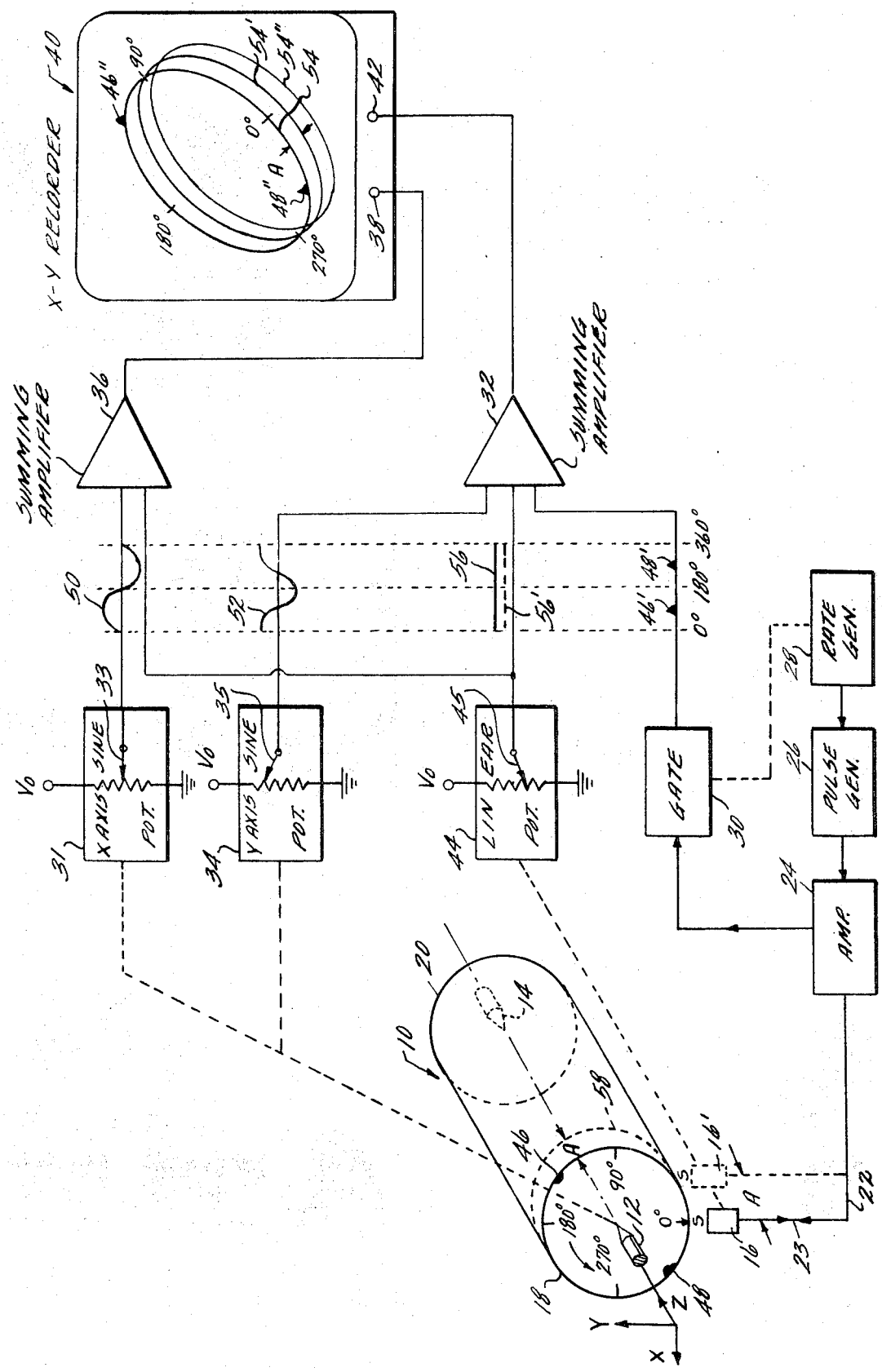

ULTRASONIC INSPECTION SYSTEM WITH PSEUDO-ISOMETRIC DISPLAY

BACKGROUND OF THE INVENTION

In general, this invention relates to an ultrasonic inspection system having a pseudo-isometric display and, more particularly, to an ultrasonic inspection system for displaying a pseudo-isometric pattern of defects occurring in a body of circular cross-section.

It has long been known to utilize ultrasonic inspection techniques for the nondestructive testing of objects and bodies for defects, such as mechanical and metallurgical discontinuities in the material thereof. Ultrasonic inspection briefly involves a method for sending a very high frequency sound wave through a material in a controlled direction, reflecting it from an impeding surface back to a receiver and displaying the return part of the wave by such means as an oscilloscope or chart recorder. The interpretation of the wave pattern shown on the display is the basis of approval or rejection of the part or article being tested. This is the general principle of operation of many ultrasonic inspection systems, although other ultrasonic techniques are also well known to the art. One such technique involves the transmission of ultrasonic waves straight through the body undergoing test.

It is also well known in the art to ultrasonically test bodies of circular cross-section for defects therein by stationing an ultrasonic transducer in spaced relation to the curvilinear surface of the body. The circular cross-sectional body can then be rotated about its center axis with the transducer scanning entirely around the circumference of the body. Multiple circumferential scans along the length of the body are generally necessary to accomplish a complete inspection of the body and can be made by guiding the transducer in incremental steps along the axial length of the circular cross-sectional body. At each incremental step the transducer must pause for sufficient time to complete a circumferential scan around the body.

X-Y chart recorders are conventionally utilized to present a display of the multiple scans. The resulting display on the X-Y chart recorder is generally a series of straight parallel lines spaced at incremental distances along the X axis of the recorder. Each straight line along the Y axis represents one circumferential scan around the cylindrical body, whereas the spacing between the lines represents the incremental distances along the axial length of the body at which the circumferential scans are made. Indications of defects within the body are displayed as local pulse distortions along the parallel lines.

The difficulties attendant this type of display involve the tedious task which the tester has of relating the defects back to their actual locations on the curvilinear surface of the body. The task is made even more difficult if the lengths of the straight parallel lines are not maintained proportional to the circumference of the part. Other difficulties relate to the fact that the starting and stopping point for one revolution of the cylindrical body are identical whereas the recorder pen traverses from one end of a straight line to the other end for each rotation of the body. This necessitates that the pen be lifted and returned to a new starting point for each circumferential scan.

Therefore, it is an object of this invention to provide an ultrasonic inspection system which displays defects in a manner permitting easy correlation of each defect so displayed to its actual location and size with respect to the surface of the body undergoing test.

It is also an object of this invention to provide a pseudo-isometric display for an ultrasonic inspection system wherein defects in a circular cross-sectional body may be readily located by only a glance at the display.

It is a further object of this invention to provide a pseudo-isometric display for an ultrasonic inspection system wherein the display includes a chart recorder and the starting and stopping point of the recorder pen are identical for each revolution of the body undergoing test.

SUMMARY OF THE INVENTION

Briefly, the above stated and other related objects of this invention are accomplished by an ultrasonic inspection system with means for displaying a pseudo-isometric pattern of defects occurring in a body of circular cross-section. The system includes means for rotating the circular cross-sectional body about its longitudinal axis. Transducer means for transmitting and receiving an ultrasonic signal are included for guided movement in a path along the longitudinal axis of the circular cross-sectional body and in fixed relation to the curvilinear surface of the body. Means for electrically exciting the transducer to transmit an ultrasonic signal are provided. Means are included to discriminate against those electrical impulses received from the transducer which represent echoes from a normal curvilinear surface of the cylindrical body and pass only those electrical impulses which represent echoes from defects within the body. Display means are included for converting two electrical input signals into a visual pattern on a two dimensional plane. Control means provide two asynchronously phased electrical output signals to the display means to trace a Lissajous pattern as a function of rotation of the circular cross-sectional body. Indexing means provide a DC voltage which is variable as a function of the transducer position along the longitudinal axis of the circular cross-sectional body. Means are included for applying the signals from the discriminator means and indexing means to the display means such that defects in the circular cross-sectional body are displayed as local pulse distortions along the Lissajous pattern and changes in transducer position along the longitudinal axis are represented by shifts in the location of the individual Lissajous patterns.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

The Drawing is a schematic representation of an ultrasonic inspection system with the pseudo-isometric display means of this invention.

DESCRIPTION OF THE PREFERRED EMBODIMENT

Referring to the drawing, there is shown a body 10 of circular cross-section to be explored for flaws, and mounted to rotate between two fixed arbors 12, 14 on a longitudinal Z axis. The body 10 is conveniently illustrated as a cylinder although it is to be understood that other bodies of circular cross-section, such as a cone, could also be used. Body 10 may be immersed in a suitable couplant liquid such as water. A common transmitting and receiving transducer 16, which is also immersed in the liquid couplant, is guided to move in a path along the longitudinal Z axis in fixed, spaced relation to the curvilinear surface of the body 10 so that the distance or spacing S is maintained constant throughout the movement of the transducer from one end 18 of the body to the opposite end 20 of the body.

The transducer 16 generates ultrasonic waves through what is commonly known as a piezoelectric effect. Piezoelectric crystals have the property of transforming electrical impulses into mechanical vibrations, and also transforming mechanical vibrations into electric impulses. Therefore, a crystal may be used as either a vibration transmittng medium or a vibration receiver. Transducer 16 employs a piezoelectric material which generates electric charges when mechanically stressed and, conversely, becomes stressed when electrically excited at these higher frequencies. The piezoelectric material may be a quartz crystal which has good electrical and mechanical stability, together with resistance to aging. Quartz crystals also have the ability to withstand high operating temperatures. Lead zirconate crystals which display as much as 10 to 12 times the efficiency of the same size quartz crystal may also be utilized. The greater acoustical efficiency of a lead zirconate crystal means that the crystal can be driven at a lower power input, and the returning signal can be clear of interferring ground signals, thereby permitting the detection of smaller defects. Transducer 16 preferably includes a crystal of relatively small diameter providing a small concentrated beam for easier location of defects.

As now becomes obvious, the transducer 16, if used as both a transmitter and receiver, cannot be operated to transmit and receive at the same time in order to avoid confusion and signal mixing. In order to prevent such confusion, the transducer 16 is actuated to transmit for a controlled period of time at a rate of several hundred times per second. The crystal thus vibrates for a brief period, and then rests or listens for the returning echo during the remainder of the excitation cycle, in a manner well known to the ultrasonic art.

The transducer 16 is connected to suitable circuit leads in a protective cable or connection lead 22 with an amplifier 24 which is adapted to transmit and to receive signals as indicated by the opposing arrows 23 of the cable 22. The amplifier 24 is connected to receive signal pulses from a pulse generator 26, the frequency of which is controlled in turn by a rate generator 28 connected with the pulse generator as indicated. The pulse output from the amplifier 24, represented by signals received from the transducer element 16, are applied to a gate circuit 30 which discriminates against the normal echo signals received from the curvilinear surfaces of the body 10, and passes only those echo signals which are representative of defects within the body 10. The gate circuit 30 is also controlled by the rate generator 28 which is set for a fixed repetition rate and acts as a timer for both the pulse generator 26 and the gate circuit 30. It is to be understood that the invention is not limited to the conventional reflective ultrasonic technique so far described, but may also be utilized with other ultrasonic techniques.

There is further provided an X axis sine potentiometer 33 and a Y axis sine potentiometer 34, both of which are connected across a DC voltage source, $V_o$, and ganged to rotate with rotation of the cylindrical body 10. The output signal from slider 33 of the X axis sine potentiometer 31 is connected to a summing amplifier 36 which may also invert the polarity of the input signals. The output signal from the summing amplifier 36 in turn connects, at terminal 38, to the X axis drive mechanism of an X-Y chart recorder 40. It will be understood that other display means such as an oscilloscope could also be used in conjunction with a camera to provide a permanent record in the same manner as a chart recorder.

There is also provided a linear potentiometer 44 connected across a DC voltage source, $V_o$, and ganged to move with translation of the transducer 16 along the longitudinal Z axis. The output signals from sliders 35 and 45 of potentiometers 34 and 44 respectively, together with the defect signals from gate 30, are connected to the input of a summing amplifier 32 which may also be of the inverting type. The summing amplifier 32 adds the input signal and provides a combined analog output signal which is applied at terminal 42 to the Y axis drive mechanism of the X-Y recorder 40.

In operation, the cylindrical body 10 is first rotated a full 360° about its longitudinal Z axis. During rotation of the body 10, transducer 16 remains in uniformly spaced relation to the surface of the body 10; however, the ultrasonic beam need not necessarily impinge normal to the curvilinear surface of the body. Thus, the transducer 16 is spaced from the surface of the body 10 under test at a predetermined fixed distance, S, while fully immersed in a liquid couplant such as water. Echo signals rebounding from the cylindrical surface of body 10, together with any echo signals that may rebound from defects therein, are converted to high frequency electrical pulses by the transducer 16, and then transmitted to the amplifier 24 via cable 22. The returning electrical impulses, after amplification by the amplifier 24, are transmitted to the gate circuit 30 which discriminates against those electrical impulses representative of echoes reflected from a normal cylindrical surface of body 10. Only those electrical signals representative of echoes reflected from defects within the cylindrical body 10 are transmitted through the gate circuit 30.

For example, assuming defects exist in the cylindrical surface of body 10 at locations designated by the numerals 46 and 48, ultrasonic signals reflected from these defects and converted to electrical pulses by the transducer 16 would be transmitted through the gate circuit 30 providing the pulse or spike signals shown generally at 46' and 48'.

The slider 33 of the X axis sine potentiometer 31, together with the slider 35 of the Y axis sine potentiometer 34, rotate in synchronism with the body 10 to provide sinusoidal output wave forms 50 and 52 respectively. Sinusoidal wave form 50 is amplified by the summing amplifier 36, whereupon the amplified signal is applied at terminal 38 to the X axis drive mechanism of the X-Y recorder 40. Sinusoidal wave form 52, after amplification by the summing amplifier 32, is applied at terminal 42 to the Y axis drive mechanism of the X-Y recorder 40. The sinusoidal wave forms 50, 52 applied to the X and Y axis drive mechanisms respectively are substantially 90° out of phase due to a phase differential between slider 33 and slider 35. The sinusoidal wave forms 50, 52 combine to drive the recorder pen (not shown) in a manner which traces the elliptical pattern shown at 54 which is generally known as a Lissajous pattern. An elliptical pattern is preferred over a true circular pattern in order to more readily reference the defects of the pattern to their actual locations on the cylindrical body 10. To this end, the rotational phasing between sliders 33 and 35 is offset to provide the two asynchronously phased electrical output signals. The slider 45 of linear potentiometer 44 remains stationary throughout the rotation of the cylindrical body 10 and provides a constant DC output voltage to the summing amplifiers 32, 36 which determines the location of elliptical pattern 54 on the X-Y chart recorder 40.

As now becomes readily apparent, the defect signals 46', 48' from the gate circuit 30 are added to the sinusoidal wave form 52 and the DC voltage output 56 by the summing amplifier 32, the combined output of which is applied at terminal 42 to the Y axis drive mechanism of the X-Y recorder. The defects are traced by the recorder as visible pulses or distortions 46" and 48", and are easily referenced with respect to the initial starting point for rotation of the body 10. For our purposes the initial starting point for rotation of body 10 is shown at the 0° mark. Location of defects along the curvilinear surface of body 10 in relation to the initial starting point of rotation are made obvious to the tester at a quick glance. No longer is it necessary for a tester to coordinate a plurality of linear traces to a cylindrical surface in order to locate the position of defects along that surface. It will also be appreciated that the elliptical pattern 54 represents one entire scan around the body 10 in a single X-Y plane without variation of the Z coordinate.

After one entire revolution of the body 10, the transducer 16 is indexed to translate a distance A along the longitudinal Z axis to the position shown by phantom lines at 16'. During translation, the transducer 16 is fixtured to maintain a uniform spacing S from the curvilinear surface of the body 10. Slider 45 of the linear potentiometer 44 moves with translation of transducer 16 providing a new DC voltage output as referenced by the phantom line 56'.

Once again, the body 10 is rotated about its longitudinal Z axis with the transducer 16' remaining in uniform fixed relation with respect to the curvilinear surface and scanning entirely around the body 10 along the phantom path 58.

The effect of the change in DC output voltage from the linear potentiometer 44 is a shift downward and to the right in the elliptical pattern to the position shown at 54'. Once again, any defects along a scanned path 58 are displayed as local pulses or distortions along the elliptical pattern 54'. Shifting the elliptical pattern as a direct function of transducer location along the longitudinal X axis provides the pseudo-isometric effect wherein the tester may quickly determine the exact location of a defect along a cylindrical surface of the body 10 by only glancing at the X-Y recorder screen. As now becomes readily apparent, the transducer 16 may be indexed in incremental steps along the entire longitudinal Z axis of the body 10, providing additional offset elliptical patterns, another one of which is shown at 54" on the X-Y recorder screen. Therefore, having above described preferred embodiments of the invention, though not exhaustive of all possible equivalents, what is desired to be secured by Letters Patent is distinctly claimed and particularly pointed out in the claims appearing below.

What is claimed is:

1. An ultrasonic inspection system for displaying a pseudo-isometric pattern of defects occuring in a body of circular cross-section wherein the system comprises:

means for rotating the body about its longitudinal axis;

transducer means for transmitting and receiving an ultrasonic signal wherein the transducer is guided to move in a path along the longitudinal axis of the body and in fixed relation to the curvilinear surface of the body;

means for electrically exciting the transducer to transmit an ultrasonic signal;

means for discriminating against those electrical impulses received from the transducer which represent echoes from a normal curvilinear surface of the body and passing only those electric impulses which represent echoes from defects within the body;

display means for converting two electrical input signals into a visual pattern on a two dimensional plane;

control means for providing two asynchronously phased electrical output signals to the display means to trace a Lissajous pattern as a function of rotation of the body;

indexing means for providing a DC voltage which is variable as a function of the transducer position along the longitudinal axis of the body;

and means for applying the signals from the discriminator means and indexing means to the display means, such that defects in the body are displayed as local pulse distortions along the Lissajous pattern and changes in transducer position along the longitudinal axis are represented by shifts in the location of the Lissajous pattern.

2. The system of claim 1 wherein the control means comprise:

means for supplying a DC voltage;

a first potentiometer connected across the DC voltage supply means and ganged to rotate with rotation of the body such that the output voltage waveform from the slider of the potentiometer approximates a sinusoidal wave upon rotation of the body;

a second potentiometer connected across the DC voltage supply means and ganged to rotate with rotation of the body such that the output voltage waveform from the slider of the second potentiometer also approximates a sinusoidal wave upon rotation of the body;

and means for offsetting the phasing between the output voltage signals from the first and second potentiometers.

3. The system of claim 2 wherein the indexing means include a third potentiometer connected across the DC voltage supply and ganged to move with movement of the transducer in a path along the longitudinal axis of the body such that the output voltage from the slider of the third potentiometer is made variable with transducer position along the axis of the body.

4. The system of claim 1 wherein:

the means for electrically exciting the transducer includes an amplifier which is adapted to transmit and receive signals from the transducer and is connected to receive signal pulses from a pulse generator, the frequency of which is controlled in turn by a rate generator connected to the pulse generator; and the discriminator means includes a gate circuit to receive signal pulses from the amplifier wherein the gate circuit is also controlled by the rate generator which acts as a timer for both the pulse generator and the gate circuit.

5. The system of claim 4 wherein the control means includes:

means for supplying a DC voltage, a first potentiometer connected across the DC voltage supply means and ganged to rotate with rotation of the body such that the output voltage waveform from the slider of the potentiometer approximates a sinusoidal wave upon rotation of the body;

a second potentiometer connected across the DC voltage supply means and ganged to rotate with rotation of the body such that the output voltage waveform from the slider of the second potentiometer also approximates a sinusoidal wave upon rotation of the body, and means for offsetting the phasing between the output voltage signals from the first and second potentiometers; and wherein the indexing means includes a third potentiometer connected across the DC voltage supply and ganged to move with movement of the transducer in a path along the longitudinal axis of the cylindrical body such that the output voltage from the slider of the third potentiometer varies with transducer position along the axis of the body.

6. The system of claim 5 wherein the visual pattern of the display means varies along a horizontal X axis as a function of one of the two electrical input signals and varies along a vertical Y axis as a function of the other of the two electrical input signals and wherein signals from the discriminator means and indexing means are added to the sinusoidal waveform from one of the potentiometers of the control means by a summing amplifier to provide one of the input signals to the display means, and wherein the signal from the indexing means is also added to the sinusoidal waveform from the other potentiometer of the control means by a second summing amplifier to provide the other input signal to the display means.

* * * * *